(12) United States Patent
Litt

(10) Patent No.: US 8,185,292 B2
(45) Date of Patent: May 22, 2012

(54) METHOD FOR ESTIMATION OF AT LEAST ONE ENGINE PARAMETER

(75) Inventor: Jonathan S. Litt, Pepper Pike, OH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/973,385

(22) Filed: Dec. 20, 2010

(65) Prior Publication Data

US 2011/0118950 A1  May 19, 2011

Related U.S. Application Data

(62) Division of application No. 11/747,362, filed on May 11, 2007, now Pat. No. 7,860,635.

(60) Provisional application No. 60/800,558, filed on May 12, 2006.

(51) Int. Cl.
*B64C 19/00* (2006.01)
*G01M 15/14* (2006.01)
*G01M 15/00* (2006.01)

(52) U.S. Cl. ..... 701/100; 701/29.1; 701/32.9; 701/34.4; 701/3

(58) Field of Classification Search ............ 701/29
See application file for complete search history.

(56) References Cited

U.S. PATENT DOCUMENTS

| | | | | |
|---|---|---|---|---|
| 4,215,412 | A * | 7/1980 | Bernier et al. | 701/100 |
| 6,063,129 | A * | 5/2000 | Dadd et al. | 703/7 |
| 6,502,085 | B1 * | 12/2002 | Adibhatla et al. | 706/52 |
| 6,539,783 | B1 * | 4/2003 | Adibhatla | 73/112.06 |
| 6,823,675 | B2 * | 11/2004 | Brunell et al. | 60/773 |
| 7,177,785 | B2 * | 2/2007 | Hartmann et al. | 703/2 |
| 7,328,128 | B2 * | 2/2008 | Bonanni et al. | 702/182 |
| 7,742,904 | B2 * | 6/2010 | Healy et al. | 703/7 |
| 7,769,507 | B2 * | 8/2010 | Volponi et al. | 701/31.6 |
| 2004/0030417 | A1 * | 2/2004 | Gribble et al. | 700/29 |
| 2004/0123600 | A1 * | 7/2004 | Brunell et al. | 60/773 |
| 2005/0043934 | A1 * | 2/2005 | Hartmann et al. | 703/2 |
| 2006/0047403 | A1 * | 3/2006 | Volponi et al. | 701/100 |

(Continued)

OTHER PUBLICATIONS

Luppold. R.H., Gallops, G.W., Kerr, L.J., Roman, J.R., "Estimating In-Flight Engine Performance Variations Using Kalman Filter Concepts," AIAA-89-2584i; 25th Joint Propulsion Conference Monterev. CA / (Jul. 10-12, 1989).

(Continued)

*Primary Examiner* — Shelley Chen
(74) *Attorney, Agent, or Firm* — Lawrence E. Anderson

(57) ABSTRACT

A system comprising determination of tuning parameters enabling optimal estimation of unmeasured engine outputs, e.g., thrust. The level of degradation of engine performance is generally described by unmeasurable health parameters related to each major engine component. Accurate thrust reconstruction depends upon knowledge of these health parameters, but there are usually too few sensors to estimate their values. A set of tuning parameters is determined which accounts for degradation by representing the overall effect of the larger set of health parameters as closely as possible in a least squares sense. The method utilizes the singular value decomposition of a matrix to generate a tuning parameter vector of low enough dimension that it can be estimated by a Kalman filter. Generation of a tuning vector specifically takes into account the variables of interest. The tuning parameters facilitate matching of both measured and unmeasured engine outputs, as well as state variables.

14 Claims, 6 Drawing Sheets

U.S. PATENT DOCUMENTS

2007/0198215 A1* 8/2007 Bonanni et al. ............... 702/183
2008/0177505 A1* 7/2008 Volponi ........................ 702/185

OTHER PUBLICATIONS

Tureyskiy, A., Meisner, R., Luppoid, R.N., Kern, R.A., and Fuller, J.W., "A Model-Based Controller for Commercial Aero Gas Turbines." ASME Paper GT2002-30041i Proceedings of ASME Turbo Expo Jun. 3-6, 2002, Amsterdam, The Netherlands (2002).

Kobayashi, T., Simon, D.L., Litt, J.S., "Application of a Constant Gain Extended Kalman Filter for In-Flight Estimation of Aircraft Engine Performance Parameters," ASME Paper GT2005-684 (2005).

Brotherton, T., Volponi A., Luppold, R., Simon, D.L., 2003, "eSTORM: Enhanced Self Tuning Onboad Remime Engine Model," Proceedings of the 2003 IEEE Aerospace Conference.

Kobayashi, T., Simon, D.L., "Application of a Bank of Kalman Fitters for Aircraft Engine Fault Diagnostics," ASME Paper GT2003-38550 (2003).

Kobayashi, T. Simon, D.L., "Evaluation of an Ehanced Bank of Kalman Filters for In-Flight Aircraft Engine Sensor Fault Diagnostics," ASME Paper GT2004-53640 (2004).

Stamatis, A. et al., "Adaptive Simulation for Gas Turbine Performance," Journal of Engineenntg for Gas Turbines and Power, 112, pp. 168-175 (1990).

Tsalavoutas, A., Mathioudakis, K., Stamatis, A., Smith, M., "Identifying Faults in the Variable Geometry System of a Gas Turbine Compressor," Journal of Turbomachinery, 123, pp. 33-39 (2001).

Ogaji, S.O.T., Sampath, S., Singh, R., Probert, S.D., "Parameter Selection for Diagnosing a Gas-Turbine's Performance-Deterioration," Applied Energy, 73, pp. 25-46 (2002).

Espana, M.D., "Sensor Biases Effect on the Estimation Algorithm for Performance-Seeking Controllers," Journal of Propulsion and Power, 10, pp. 527-532 (1994).

Callier, F.M., and Desoer, C.A., "Linear System Theory," Springer-Verlag, New York, p. 240 (1991).

Stewart, G. , W. , Introduction to Matrix Computations, Academic Press, New York, pp. 322-324 (1973).

Chen, S., Billings, S.A., Luo, W., "Orthogonal Least Squares Methods and Their Application to Non-Linear System Identification," International Journal of Control, 50, pp. 1873-1896 (1989).

Chen, S., Cowan, C.F.N., Grant, P.M., "Orthogonal Least Squares Learning Algorithm for Radial Basis Function Networks," IEEE Transacations on Neural Networks, 2, pp. 302-309 (1991).

Stamatis, A. Mathioudakis, K., Papailiou, K.D., "Optimal Measurement and Health Index Selection for Gas Turbine Performance Status and Fault Diagnosis," Journal of Engineering for Gas Turbines and Power, 114, pp. 209-216 (1992).

Gronstedt, T.U.J., "Identifiability in MultiPoint Gas Turbine Parameter Estimation Problems," ASME Paper GT2002-30020 (2002) Proceedings of ASME Turbo Expo 2002 Jun. 3-6, 2002, Amsterdam, The Netherland.

Pinelli, M., Sinal P.R. , "Gas Turbine Field Performance Determination Sources of Uncertainties," Journal of Engineering for Gas Turbines and Power, 124, pp. 155-160 (2002).

Mathioudakis, K., Kamboukos, Ph., "Assessment of the Effectiveness of Gas Path Diagnostic Schemes," ASME Paper GT2004-53862i, Proceedings of ASME Turbo Expo 2004 Jun. 14-17, 2004, Vienna, Austria (2004).

Mathioudakis, et al."Assessment of the Effectiveness of Gas Path Diagnostic Schemes," J. Eng. Gas Turbines Power vol. 128, Issue 1, 57 (Jan. 2006).

Litt, J., et al. "A Demonstration of a Retrofit Architecture for Intelligent Control and Diagnostics of a Turbofan Engine," NASA/TM—2005-214019, ARL—TR-3667, AIAA—2005-6905, Dec. 2005. URL: 2005/TM—2005-214019.pdf.

* cited by examiner

METHOD FOR ESTIMATION OF AT LEAST ONE ENGINE PARAMETER

CROSS REFERENCE TO RELATED APPLICATIONS

This application is a divisional application of and claims priority of U.S. Pat. No. 7,860,635 "Singular Value Decomposition-Based Method for Optimal Estimation of Turbofan Engine Thrust and Other Unmeasurable Parameters," by J S Litt, filed May 11, 2007, and claims priority of U.S. Prov. Appl. No. 60/800,558, by J S Litt, filed May 12, 2006, both of which are incorporated herein by reference.

STATEMENT REGARDING FEDERALLY SPONSORED RESEARCH OR DEVELOPMENT

The invention described herein may be manufactured and used by and for the Government of the United States of America for government purposes without the payment of any royalties therefor.

BACKGROUND OF THE INVENTION

I-flight estimation of unmeasurable turbofan engine outputs, such as thrust, is difficult because the values depend on the degradation level of the engine; which is often not known accurately. Degradation is generally defined in terms of off-nominal values of health parameters, such as efficiency and flow capacity, related to each major engine component. By the invention, it is now possible to estimate these health parameters deviations, given that there are at least as many sensors as parameters to be estimated. In standard engine installations, however, there are typically fewer sensors than health parameters, making accurate estimation impossible. An approach used in this situation is to select a subset of health parameters to estimate, assuming the others remain unchanged. If any of the unaccounted-for health parameters deviate from nominal, their effect will be captured to some extent in the estimated subset. As a result, the estimated values will no longer represent the true health parameters deviations. There are examples in the literature of a subset of health parameter "tuners" being used to reconstruct performance variables such as thrust (Luppold, R. H., Gallops, G. W., Kerr, L. J., Roman, J. R., 1989, "Estimating I-Flight Engine Performance Variations Using Kalman Filter Concepts," AIAA-89-2584; Turevskiy, A., Meisner, R., Luppold, R. H., Kern, R. A., and Fuller, J. W., 2002, "A Model-Based Controller for Commercial Aero Gas Turbines," ASME Paper GT2002-30041; Kobayashi, T., Simon, D. L., Litt, J. S., 2005, "Application of a Constant Gain Extended Kalman Filter for I-Flight Estimation of Aircraft Engine Performance Parameters," ASME Paper GT2005-68494; the entire disclosures of which are herein incorporated by reference), but this approach of health parameter subset selection is much better established as a diagnostic tool for gas path analysis (Brotherton, T., Volponi A., Luppold, R., Simon, D. L., 2003, "eSTORM: Enhanced Self Tuning O-board Realtime Engine Model," Proceedings of the 2003 IEEE Aerospace Conference; Kobayashi, T., Simon, D. L., 2003, "Application of a Bank of Kalman Filters for Aircraft Engine Fault Diagnostics," ASME Paper GT2003-38550; Kobayashi, T., Simon, D. L., 2004, "Evaluation of an Enhanced Bank of Kalman Filters for I-Flight Aircraft Engine Sensor Fault Diagnostics," ASME Paper GT2004-53640; the entire disclosures of which are herein incorporated by reference), where studies have determined which health parameters give good indications of certain faults for particular types of turbine engines (Stamatis, A., Mathioudakis, K., Papailiou, K. D., 1990, "Adaptive Simulation of Gas Turbine Performance," Journal of Engineering for Gas Turbines and Power, 112, pp. 168-175; Tsalavoutas, A., Mathioudakis, K., Stamatis, A., Smith, M., 2001, "Identifying Faults in the Variable Geometry System of a Gas Turbine Compressor," Journal of Turbomachinery, 123, pp. 33-39; Ogaji, S. O. T., Sampath, S., Singh, R., Probert, S. D., 2002, "Parameter Selection for Diagnosing a Gas-Turbine's Performance-Deterioration," Applied Energy, 73, pp. 25-46; the entire disclosures of which are herein incorporated by reference).

When a Kalman filter is used to estimate the subset of health parameters, the estimates of measured outputs will usually be good, i.e., the sensed outputs and the recreated values obtained using the health parameter estimates will match, even if the health parameter estimates themselves are inaccurate. However, good estimation of sensed outputs does not guarantee that the estimation of unmeasured outputs will be accurate. Since thrust is affected by the level of degradation, poor health parameter estimation can result in poor thrust reconstruction. It might be possible to determine a subset of health parameters that produces good thrust reconstruction even when all health parameters deviate, but this is a time-consuming, empirical, trial-and-error process that gives no guarantee about the optimality of the result given the potential range of health parameter deviations and operating conditions.

The main issue that affects the estimation accuracy is that the total influence of the health parameters needs to be approximated using fewer variables. The selection of a subset of health parameters is not a general approach to solving this problem as long as all health parameters may deviate.

BRIEF SUMMARY OF THE INVENTION

Applicant has derived a set of tuning parameters (not necessarily a subset of health parameters) that is smaller in dimension than the set of health parameters, but retains as much information as possible from that original set.

The following sections of this application describe and formulate the thrust estimation problem mathematically, and then outline a new approach to the solution using singular value decomposition to obtain an optimal set of tuners. Following that, a concise design process is described that generates a set of optimal tuners at each operating (linearization) point, explicitly including all variables of interest; these tuners are incorporated into the Kalman filter to provide the optimal estimates. The technique is then demonstrated through an example. After the example, there is further disclosure about the technique that covers other applications, such as its use as a diagnostic and control tool.

DETAILED DESCRIPTION OF THE INVENTION

Figure 1:
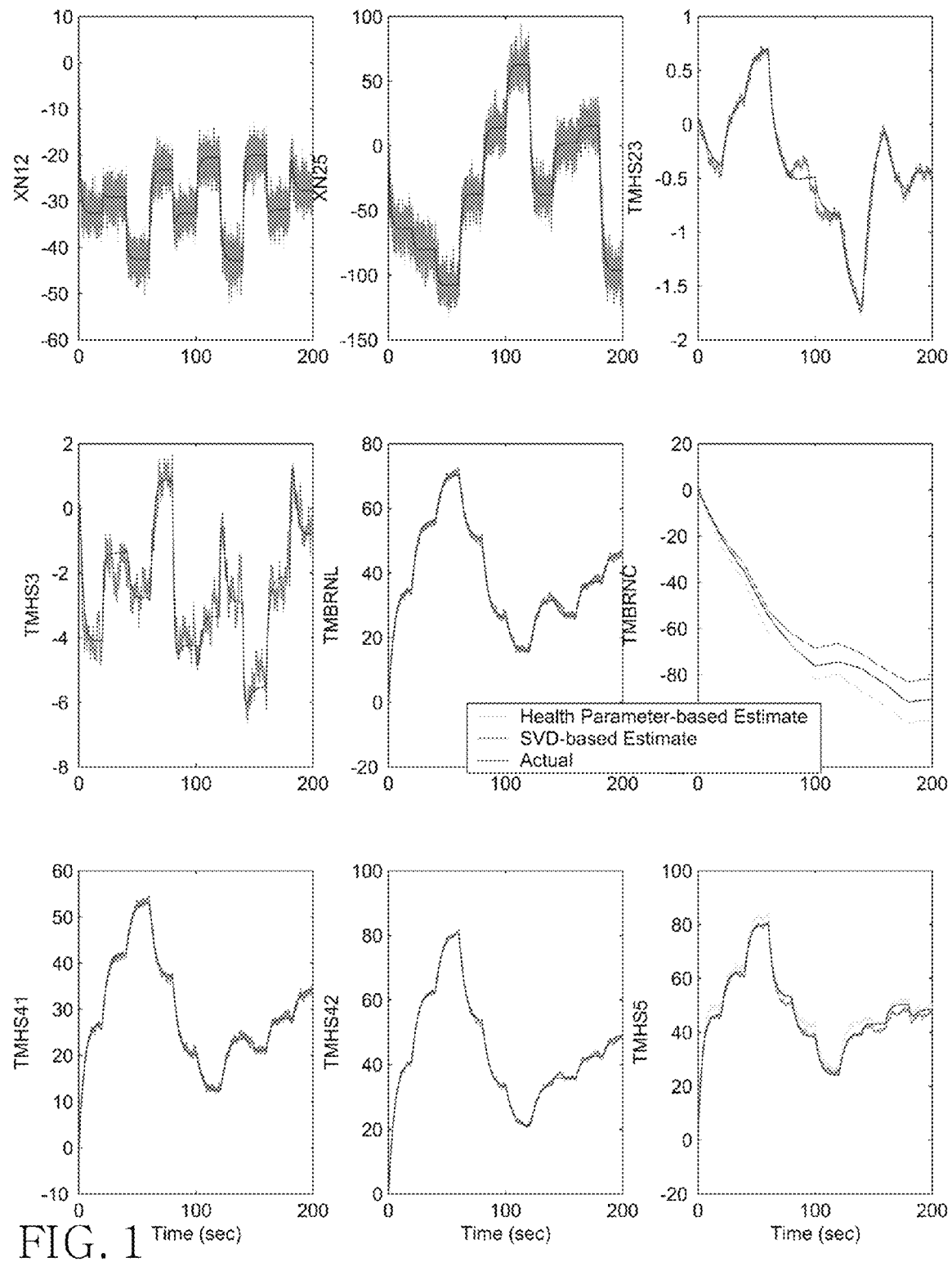
FIG. 1 shows the state variable estimation over a time sequence containing 10 such sets of random shifts.

In the disclosure of the invention, the nomenclature in the following table will be utilized as a shorthand manner of expressing the concepts utilized in the invention.

| NOMENCLATURE | |
|---|---|
| $A, A_{Aug}, B, B_{Aug}, C, C_{Aug}, D, E, E_{Aug}, F, G, L, M, N$ | System Matrices |
| e, w | Noise Vectors |
| FAN | Fan |
| FG | Gross Thrust |
| FN | Net Thrust |
| HPC | High Pressure Compressor |
| HPT | High Pressure Turbine |
| LPC | Low Pressure Compressor |
| LPT | Low Pressure Turbine |
| LS | Least Squares (subscript) |
| P | Vector of health parameters |
| P17 | Bypass discharge pressure |
| P25 | HPC inlet pressure |
| PS3 | Combustor inlet static pressure |
| Q, R | Noise covariance matrices |
| Q | Vector of optimal tuners |
| SMW12 | Fan stall margin |
| SMW2 | LPC stall margin |
| SMW25 | HPC stall margin |
| T25 | HPC inlet temperature |
| T3 | Combustor inlet temperature |
| T49 | LPT inlet temperature |
| TMHS23 | LPC metal temperature |
| TMHS3 | HPC metal temperature |
| TMHS41 | HPT nozzle metal temperature |
| TMHS42 | HPT metal temperature |
| TMHS5 | LPT metal temperature |
| TMBRNC | Combustor case metal temperature |
| TMBRNL | Combustor liner metal temperature |
| U | Orthogonal matrix obtained using SVD |
| U* | Optimal transformation matrix |
| u | Vector of control inputs |
| $u_i$ | ith column of U |
| V | Orthogonal matrix obtained using SVD |
| V* | Optimal transformation matrix |
| $v_i$ | ith column of V |
| VBV | Variable bleed valve |
| VSV | Variable stator valve |
| WF36 | Fuel flow |
| WR2A | Total FAN corrected flow |
| x | State vector |
| $x_{Aug}$ | Augmented state vector |
| XN12 | Low-pressure spool speed |
| XN25 | High-pressure spool speed |
| z | Vector of auxiliary outputs |
| δ | Vector of health parameter-induced shifts |
| Σ | Singular valve matrix obtained using SVD |
| $\sigma_i$ | ith singular valve |

Problem Development

For a linear point designed or a piece-wise linear state variable model, the equations of interest are:

$$\dot{x} = Ax + Bu + Lp + e$$

$$y = Cx + Du + Mp + w$$

$$z = Ex + Fu + Np \qquad (1)$$

where x is the vector of state variables, u is the vector of control inputs, y is the vector of measured outputs, and z is the vector of auxiliary (unmeasurable or at least unmeasured) model-based outputs. The vector p represents the engine health parameters, which induce shifts in other variables as the health parameters move away from their nominal values. The vector e represents white process noise with covariance Q, and w represents white measurement noise with covariance R. The matrices A, B, C, D, E, F, L, M, and N are of appropriate dimension.

As the health parameter vector p is an unknown input to the system, applicants are able to estimate it since it affects unmeasurable parameters such as thrust. The health parameters may be treated as a set of biases, and thus are modeled without dynamics. With this interpretation, we can represent equation (1) as:

$$\begin{bmatrix} \dot{x} \\ \dot{p} \end{bmatrix} = \begin{bmatrix} A & L \\ 0 & 0 \end{bmatrix} \begin{bmatrix} x \\ p \end{bmatrix} + \begin{bmatrix} B \\ 0 \end{bmatrix} u + e = A_{Aug} x_{Aug} + B_{Aug} u + e \qquad (2)$$

$$y = \begin{bmatrix} C & M \end{bmatrix} \begin{bmatrix} x \\ p \end{bmatrix} + Du + w = C_{Aug} x_{Aug} + Du + w$$

$$z = \begin{bmatrix} E & N \end{bmatrix} \begin{bmatrix} x \\ p \end{bmatrix} + Fu = E_{Aug} x_{Aug} + Fu.$$

This new system has at least as many eigenvalues at the origin as there are elements of p (the eigenvalues of $A_{Aug}$ are the eigenvalues of A plus an additional dim(p) zeros due to the augmentation). Once the p vector is appended to the state vector, it may be directly estimated, provided that the realization in equation (2) is observable.

Using this formulation, the number of health parameters that can be estimated is limited to the number of sensors, the dimension of y (Espana, M. D., 1994, "Sensor Biases Effect on the Estimation Algorithm for Performance-Seeking Controllers," Journal of Propulsion and Power, 10, pp. 527-532). This is easily seen by examining the observability criterion (Callier, F. M., and Desoer, C. A., 1991, Linear Systems Theory, Springer-Verlag, New York, p. 240; the entire disclosure of which is herein incorporated by reference), which states that for observability, the matrix $[(\lambda I - A_{Aug})^T C_{Aug}^T]^T$ must be full rank for each eigenvalue, λ, of $A_{Aug}$, i.e., $$\forall \lambda \in \{eig(A_{Aug})\},$$

$$\text{rank}\left(\begin{bmatrix} \lambda I - A_{Aug} \\ C_{Aug} \end{bmatrix}\right) = dim(x_{Aug}).$$

Since the matrix $A_{Aug}$ in equation (2) clearly has at least as many zero eigenvalues as there are health parameters, the observability criterion matrix reduces to $[-A^T_{Aug} \, C^T_{Aug}]^T$ for each zero eigenvalue, implying that for observability, $C_{Aug}$ must have at least as many rows (i.e., there must be at least as many sensors) as $A_{Aug}$ has rows of zeros.

Since there are usually fewer sensors than health parameters, the problem becomes one of choosing the best set of tuners for the application. This is addressed next.

Problem Formulation

In this application, the objective is to determine a tuning vector of low enough dimension to be estimated, that represents as much of the health parameter information as possible in a known way. This tuning vector should permit shifts in the variables of interest, caused by health parameter deviations, to be represented as closely as possible in a least squares sense.

We may define δ as the vector of shifts due to the health parameters, $$\delta = \begin{bmatrix} L \\ M \\ N \end{bmatrix} p = Gp. \qquad (3)$$

Given that the number of elements in the tuning vector (tuners) is less than the number of health parameters, we know that, except for specific cases, the estimated tuners will not represent true health parameter values. Therefore, there is no reason to model the tuning vector as a subset of existing health parameters and, in fact, δ can be matched more closely without this constraint. The key is to find a matrix U* and tuning vector q that correspond to G and p in equation (3), of small enough dimension that the tuning vector can be estimated, and the product approximates δ in a least square sense. That is, $$\delta = Gp \approx \hat{\delta} = U^*q, \; p \in \mathbb{R}^n, \; q \in \mathbb{R}^k, \; k < n \text{ and } J = (\delta - \hat{\delta})^T (\delta - \hat{\delta})$$
$$= \tilde{\delta}^T \tilde{\delta} \qquad (4)$$

is minimized.

For the tuning vector q to contain as much of the information contained in p as possible, p is mapped into q through a transformation V* such that q=V*p where V* is full rank. Thus, equation (4) becomes $$J = (\delta - \hat{\delta})^T (\delta - \hat{\delta}) \qquad (5)$$
$$= (G_p - U^*q)^T (G_p - U^*q)$$
$$= p^T (G - U^*V^*)^T (G - U^*V^*) p.$$

Since G may have rank as large as n (full rank) and the inner dimension of U*V* is only k, U*V* will not be full rank. Thus, equation (5) may be rewritten in vector 2-norm notation, $$J = \min_{rank(U^*V^*)=k} \| \delta - U^*V^*p \|_2^2. \qquad (6)$$

Another interpretation of equation (5) is that we want to approximate G by a lower rank matrix through the minimization of the Frobenius norm (the square root of the sum of the squares of each matrix element), i.e., $$J = \min_{rank(U^*V^*)=k} \| G - U^*V^* \|_F.$$

The solution to both of these minimization problems is obtained using Singular Value Decomposition (SVD) (Stewart, G., W., 1973, Introduction to Matrix Computations, Academic Press, New York, pp. 322-324), and we shall show that SVD leads to an optimal solution of the form U*V*.

Singular Value Decomposition

The Singular Value Decomposition (SVD) of any m×n matrix G, with m≧n, may be defined as $$G = U\Sigma V^T \qquad (7)$$

where U and $V^T$ are orthonormal square matrices, $U \in \mathbb{R}^{m \times m}$, $V \in \mathbb{R}^{n \times n}$, and Σ is a matrix of the same dimensions as G, with the upper portion a diagonal matrix of the singular values of G and the lower portion all zeroes. That $$\Sigma = \begin{bmatrix} \sigma_1 & 0 & \ldots & 0 \\ 0 & \sigma_2 & & \vdots \\ \vdots & & \ddots & 0 \\ 0 & \ldots & 0 & \sigma_n \\ 0 & \ldots & 0 & 0 \end{bmatrix}$$

where $\sigma_1 \geq \sigma_2 \geq \ldots \geq \sigma_n \geq 0$, $UU^T = I_m$, and $VV^T = I_n$.

Some algebraic manipulation shows that equation (7) is equivalent to:

$$G = \sum_{i=1}^n \sigma_i u_i v_i^T \qquad (8)$$

where $u_i$ is the ith column of U and $v_1$ is the ith column of V ($v_i^T$ the ith row of $V^T$). Equation (8) is called the rank one decomposition of G because G is represented by the sum of rank one matrices.

If the rank of an m×n matrix H is k<n, its SVD is $$H = \begin{bmatrix} u_1 & \ldots & u_k & u_{k+1} & \ldots & u_m \\ \hline & U_k & & & & \end{bmatrix} \begin{bmatrix} \Sigma_k & 0 \\ 0 & 0 \end{bmatrix} \begin{bmatrix} v_1 & \ldots & v_k & v_{k+1} & \ldots & v_n \\ \hline & V_k & & & & \end{bmatrix}^T \qquad (9)$$
$$= \begin{bmatrix} U_k & u_{k+1} & \ldots & u_m \end{bmatrix} \begin{bmatrix} \Sigma_k & 0 \\ 0 & 0 \end{bmatrix} \begin{bmatrix} V_k & v_{k+1} & \ldots & v_n \end{bmatrix}^T = U_k \Sigma_k V_k^T$$

where $U_k$ consists of the first k columns of U, $V_k$ consists of the first k columns of V, and $\Sigma_k$ is the upper left diagonal k×k block of Σ containing the no-zero singular values.

The linear least squares problem $$\min_{rank(H)=k} \| \delta - Hp \|_2^2$$

can be solved using equation (9) as $$p_{LS} = H^\dagger \delta \qquad (10)$$
$$= \begin{bmatrix} V_k & v_{k+1} & \ldots & v_m \end{bmatrix} \begin{bmatrix} \Sigma_k^{-1} & 0 \\ 0 & 0 \end{bmatrix} \begin{bmatrix} U_k & u_{k+1} & \ldots & u_n \end{bmatrix}^T \delta$$
$$= V_k \Sigma_k^{-1} U_k^T \delta$$

where the pseudo-inverse of the no-square, no-full rank, block diagonal singular value matrix Σ in equation (9) is that matrix's transpose with the no-zero block inverted.

Additionally, any full rank m×n matrix G, with m≧n, is most closely approximated in the Frobenius norm sense by a matrix H of rank k<n, i.e., $$\| G - H \|_F = \min_{rank(H)=k} \| G - H \|_F,$$

when H is given by $$H = \sum_{i=1}^{k} \sigma_i u_i v_i^T = U_k \Sigma_k V_k^T, \quad (11)$$

the first k terms of equation (8).

The Frobenius norm is equal to the square root of the sum of the squares of the singular values of the matrix (which is equal to the square root of the sum of the squares of each matrix element) so $$\|G-H\|_F = \sqrt{\sigma_{k+1}^2 + \ldots + \sigma_n^2}$$

is minimal since the singular values are ordered from largest to smallest and the difference consists of only the smallest ones.

Thus, equations (9) and (11) are the same, and both imply equation (10). Moreover, the solution has the structure of the original U*V* formulation proposed in equation (5), even though this structure was not assumed in the derivation of these results, it simply falls out as a consequence of the SVD approach (Stewart, G. W., 1973, Introduction to Matrix Computations, Academic Press, New York, pp. 322-324; the entire disclosure of which is herein incorporated by reference; or a similar text for derivations, proofs, definitions of norms, etc.).

This demonstrates that using the SVD to obtain the U*V* formulation will indeed give the optimal approximation to δ in a least squares sense. The procedure for coming up with the optimal matrices and their use will be described next.

Design Procedure

The design procedure follows directly from the above derivation.

1. For each linearization point, create G by stacking L, M, and N as in equation (3). The L and M matrices must be included for the accuracy of the Kalman filter estimates, the variables used to create N are left to the user's discretion.

2. Compute the magnitude of each row $g_i$ of G as $g_i g_i^T$ for scaling. Premultiply G by $$W = \begin{bmatrix} \sqrt{g_1 g_1^T} & 0 & 0 \\ 0 & \ddots & 0 \\ 0 & 0 & \sqrt{g_m g_m^T} \end{bmatrix}^{-1}.$$

This is important because there may be several orders of magnitude difference between the values in different rows of G, and, since the SVD minimizes the difference between the elements of G and U*V* in a least squares sense (Frobenius norm), all rows should be about the same magnitude to prevent the large matrix elements from dominating. Recognizing, however, that some variables need to be estimated more accurately than others, additional weights can be incorporated into the diagonal elements of W to account for this relative importance. This is all done after any other scaling or balancing used to develop the initial realization (eq. 1).

3. Compute the SVD as in equation (7) from the scaled G, $WG = (WU)\Sigma V^T$.

4. Unscale WU by premultiplying by $W^{-1}$. This brings the magnitude of each row back to its appropriate level and makes it compatible with the rest of the realization.

5. Generate U* and V* by selecting only the k most significant terms of equation (8). At most, k will equal the number of sensors less the number of zero eigenvalues in the original A matrix. Incorporate the k×k singular value matrix into U* such that $U^* = U_k \Sigma_k$ and $V^* = V_k^T$. Thus $$G = \begin{bmatrix} L \\ M \\ N \end{bmatrix} \approx \hat{G} = (U_k \Sigma_k) V_k^T = U^* V^* = \begin{bmatrix} U_L^* \\ U_M^* \\ U_N^* \end{bmatrix} V^* = \begin{bmatrix} \hat{L} \\ \hat{M} \\ \hat{N} \end{bmatrix}$$

where $U_L^* V^* = \hat{L} \approx L$, $U_M^* V^* = \hat{M} \approx M$, and $U_N^* V^* = \hat{N} \approx N$. Thus, I have generated a common right factor for the approximation of all three matrices L, M, and N.

6. Using the rows of U* that correspond to the original L, M, and N, set up the Kalman filter using the new augmented system equations $$\begin{bmatrix} \dot{x} \\ \dot{q} \end{bmatrix} = \begin{bmatrix} A & U_L^* \\ 0 & 0 \end{bmatrix} \begin{bmatrix} x \\ q \end{bmatrix} + \begin{bmatrix} B \\ 0 \end{bmatrix} u + e, \quad (12)$$

$$y = \begin{bmatrix} C & U_M^* \end{bmatrix} \begin{bmatrix} x \\ q \end{bmatrix} + Du + w.$$

$$z = \begin{bmatrix} E & U_N^* \end{bmatrix} \begin{bmatrix} x \\ q \end{bmatrix} + Fu$$

This system will generally be observable if q is of small enough dimension.

Turbofan Engine Example

A large commercial turbofan engine model linearized at a cruise operating point is used to evaluate the concept. The model has nine state variables, 10 health parameters, three control inputs, all shown in table 1, and seven sensors, shown in table 2. The auxiliary outputs of interest are shown in table 3. The linear model is used as the "truth" model for this example. It must be noted that for this work, the P25 measurement in the conventional sensor suite is replaced by P17. Without this substitution, thrust estimation is poor. This indicates that the ability to estimate unmeasured outputs is strongly influenced by sensor location. The weights on net and gross thrust (step 2 in the design procedure) are doubled because of the relative importance of these auxiliary variables. The model is run open-loop, so all control inputs remain at 0, i.e., they do not deviate from the trim value for the linear model and no actuator bias is present. All 10 health parameters are shifted randomly up to 3 percent in the direction of degradation, and these shifts result in shifts in the measured variables. The linear truth model and Kalman filter estimator use the same A, B, C, and D matrices, but the truth model has all 10 health parameters entering through the L, M, and N matrices. The Kalman filter is set up using the system in equation (12) with a seven-element q vector.

To demonstrate the optimality of the SVD-based tuner approach, it was compared to the Kalman filter approach that uses health parameter-based tuners. To make the comparison as meaningful as possible, the health parameter tuners were chosen specifically to be compatible with the metric used by the SVD approach (eq. 4). Structurally, the Kalman filter is designed to estimate seven selected health parameter tuners (while assuming the others remain constant) and the corresponding columns of L, N, and N are retained. An optimal selection process based on orthogonal least squares (OLS) (Chen, S., Billings, S. A., Luo, W., "Orthogonal Least Squares Methods and Their Application to No-Linear System Identification," 1989, International Journal of Control, 50, pp. 1873-1896; Chen, S., Cowan, C. F. N., Grant, P. M., 1991, "Orthogonal Least Squares Learning Algorithm for Radial Basis Function Networks," IEEE Transactions on Neural Networks, 2, pp. 302-309; the entire disclosures of which are herein incorporated by reference) is used to determine which health parameters to estimate. Briefly, the scaled G matrix (from step 2 in the design procedure, the same one as used for the SVD-based tuners) is multiplied by a random health parameter vector p whose 10 elements take on values from 0 to 3 percent in the appropriate direction (positive for the HPT and LPT flow capacities, negative for all others). OLS is used to choose the seven columns of G that best align with the shift vector δ=Gp. This is repeated thousands of times for different random p vectors and the results are tallied. The individual columns that are selected most often determine the health parameters that on average best capture the degradation-induced shifts. The most often selected columns are indicated by asterisk (*) in table 1. Of the 120 (10 choose 7) possible sets of columns, this exact set was selected about 9 percent of the time.

TABLE 1

STATE VARIABLES, HEALTH PARAMETERS, AND ACTUATORS

| State Variables | Health Parameters | Actuators |
|---|---|---|
| XN12 | FAN efficiency‡ | WF36 |
| XN25 | FAN flow capacity*‡§ | VBV |
| TMHS23 | LPC efficiency*‡ | VSV |
| TMHS3 | LPC flow capacity‡§ | |
| TMBRNL | HPC efficiency*‡ | |
| TMBRNC | HPC flow capacity*‡§ | |
| TMHS41 | HPT efficiency*‡§ | |
| TMHS42 | HPT flow capacity*‡§ | |
| TMHS5 | LPT efficiency | |
| | LPT flow capacity*§ | |

TABLE 2

SENSOR SETS AND SENSOR STANDARD DEVIATION (STD. DEV. AS % OF STEADY-STATE VALUES AT FULL POWER

| Conventional Sensor Set | New Sensor Set | Standard Deviation (%) |
|---|---|---|
| XN12 | XN12 | 0.25 |
| XN25 | XN25 | 0.25 |
| | P17 | 0.50 |
| P25 | | 0.50 |
| T25 | T25 | 0.75 |
| PS3 | PS3 | 0.50 |
| T3 | T3 | 0.75 |
| T49 | T49 | 0.75 |

TABLE 3

AUXILIARY OUTPUTS TO BE ESTIMATED IN FLIGHT
Auxiliary Outputs

WR2A
FN
FG
SMW12
SMW2
SMW25

Results

To demonstrate the ability of the optimal tuners to approximate a variety of health parameter-induced shifts well, all 10 health parameters are shifted randomly. The results shown are for a representative random sequence, many simultaneous random shifts were performed at this operating point with similar results. FIG. 1 shows the state variable estimation over a time sequence containing 10 such sets of random shifts. Generally, the variables are reconstructed accurately with the exception of TMBRNC, combustor case metal temperature, which does not seem to have much of an effect on any other variables.

Figure 2:
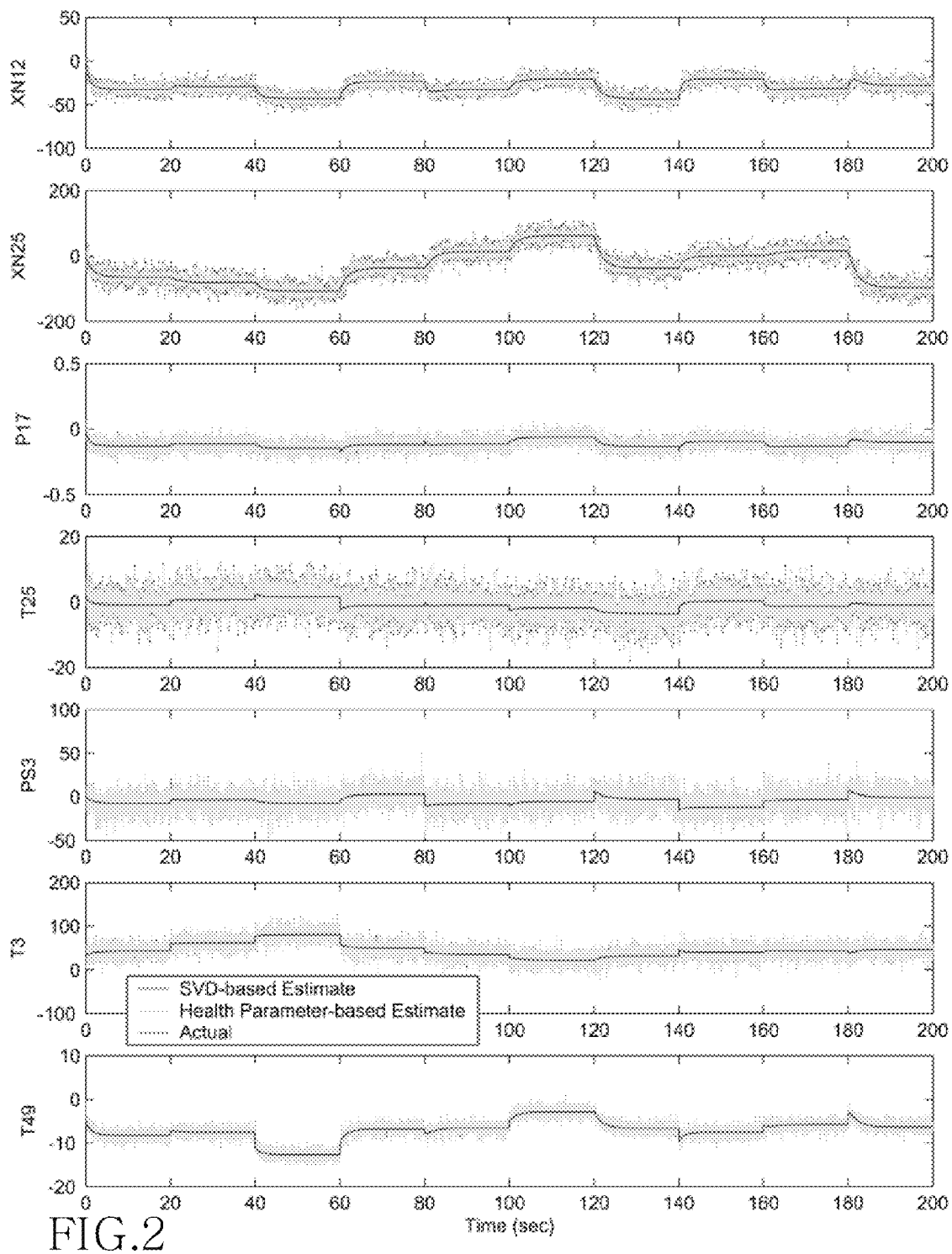
FIG. 2 shows the output variables for the same time sequence as in FIG. 1 of health parameter shifts.

FIG. 2 shows the output variables for the same time sequence as in FIG. 1 of health parameter shifts. These also demonstrate good matching, which is to be expected when using a Kalman filter.

Figure 3:
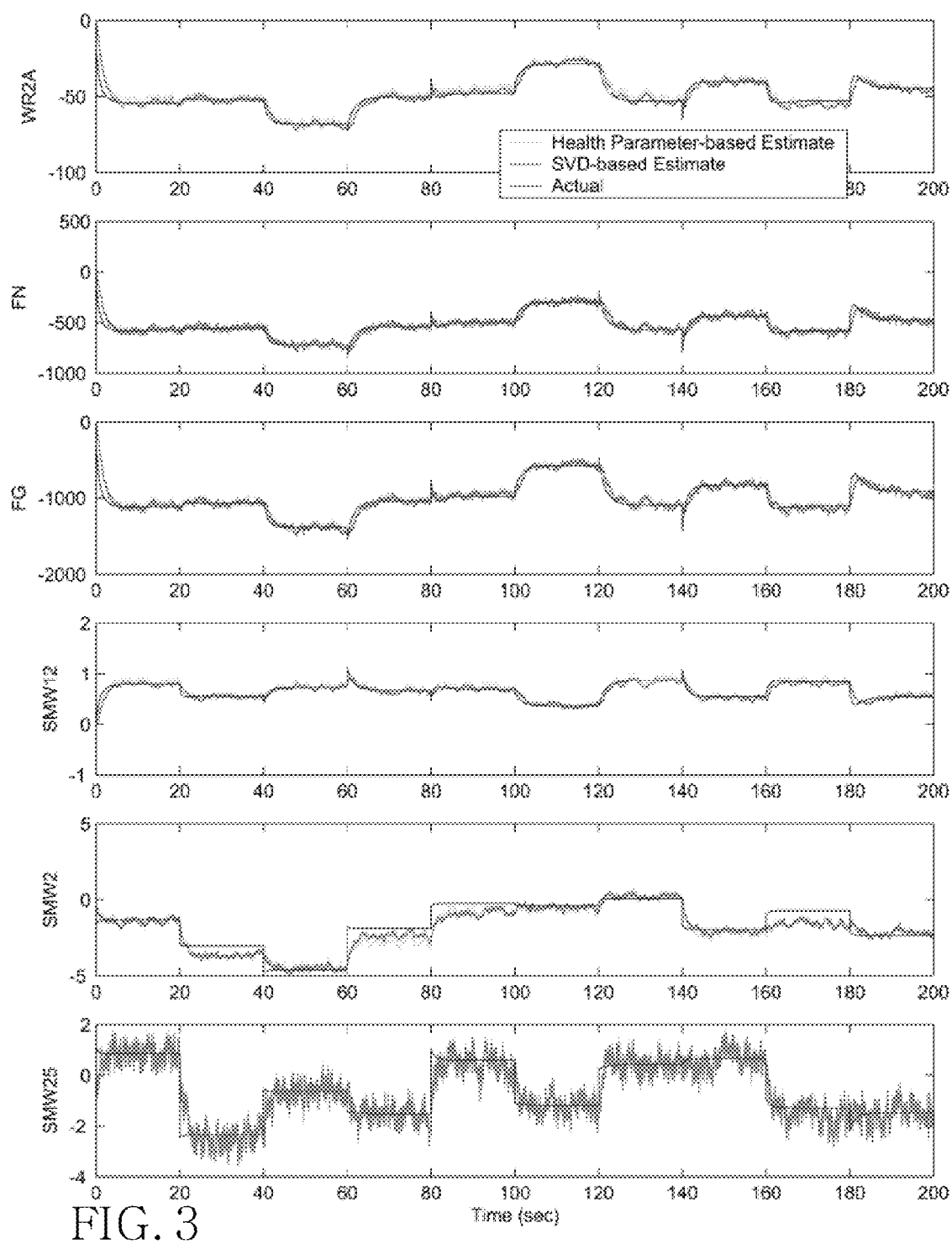
FIG. 3 shows the auxiliary parameters scaled actual and filtered estimates.

FIG. 3 shows the auxiliary parameters scaled actual and filtered estimates. For all case of health parameter shifts, both estimators performed well. Because of the large gains on some of the auxiliary variables, the estimates needed to be low-pass filtered to attenuate the magnified noise level. The estimation performance on net and gross thrust and two of the three stall margins, as well as total fan corrected flow was consistently accurate. The only auxiliary parameter whose estimate was consistently poor is LPC stall margin, SMW2. Adjustment of the weighting matrix W in step 2 of the design procedure made little difference in the results.

In an effort to obtain a better LPC stall margin estimate, new U* and V* were determined, this time using SMW2 as the only auxiliary parameter, i.e., N in equation (3) has only one row. If SMW2 requires different information than the other variables for accurate estimation, generating a new G matrix would result in a different SVD (the SVD of a matrix is unique) possibly prioritizing the tuners such that SMW2 could be reconstructed. Even with the new G matrix though, the estimation of SMW2 is poor. This may be due to the L and M matrices dominating the generation of the U* and V* matrices, but it is more likely a sensor placement issue (in fact, replacing P17 with P25 greatly improves the estimation of SMW2, even without additional weighting).

Likewise, a slight improvement in net and gross thrust estimation was achieved by the SVD-based tuners when the auxiliary parameters consisted of only those two variables.

In order to compare the performance of the tuners statistically, runs containing a sequence of 400 simultaneous random shifts of all 10 health parameters were performed. After each set of shifts, the engine simulation was allowed to reach steady state and data from each variable were gathered and averaged. This information was used to compute an average percent error for each variable in steady state over the entire sequence. The quantity was computed as:

$$\% \text{ error} = \frac{100}{400} \sum_{i=1}^{400} \left| \frac{\text{actual deviation}_i - \text{estimated deviation}_i}{\text{trim value}_i} \right|$$

$$\approx \frac{100}{400} \sum_{i=1}^{400} \left| \frac{\text{actual}_i - \text{estimate}_i}{\text{actual}_i} \right|$$

The comparison of the percent estimation error of the state variables, outputs, and auxiliary outputs based on this run for the two sets of tuners are presented in table 4, table 5, and table 6, respectively. It can be seen that both sets of tuners produce similar results in most cases, but where the error is relatively large (TMBNC in table 4 and SMW2 and SMW25 in table 6), the SVD-based tuners are significantly better. Results for the estimated degradation-induced shifts in each variable, δ=Gp (eq. 3), were similar. The value of the metric (eq. 4) for the scaled shifts in the two cases was 2.187 for the SVD-based tuners and 6.016 for the health parameter-based tuners. It must be noted that minimization of the metric does not in itself guarantee minimization of the total least squares error without approximate weighting in step 2 of the design procedure. In this example, the SVD-based tuners give a value of 42.6865 for the sum of the squared percent estimation error of the variables in table 4, table 5, and table 6, compared to 95.4661 for the health parameter-based tuners.

TABLE 4

PERCENT ERROR OF STATE VARIABLE ESTIMATES

| State Variables | SVD-based Tuners | Health Parameter-Based Tuners |
|---|---|---|
| XN12 | 0.0318 | 0.0317 |
| XN25 | 0.0269 | 0.0267 |
| TMHS23 | 0.0129 | 0.0130 |
| TMHS3 | 0.0363 | 0.0363 |
| TMBRNL | 0.0278 | 0.0306 |
| TMBRNC | 0.4083 | 1.1256 |
| TMHS41 | 0.0300 | 0.0313 |
| TMHS42 | 0.0267 | 0.0274 |
| TMHS5 | 0.3208 | 0.1942 |

TABLE 5

PERCENT ERROR OF OUTPUT ESTIMATES

| Outputs | SVD-based Tuners | Health Parameter-Based Tuners |
|---|---|---|
| XN12 | 0.0317 | 0.0318 |
| XN25 | 0.0286 | 0.0285 |
| P17 | 0.0634 | 0.0633 |
| T25 | 0.0859 | 0.0857 |
| PS3 | 0.1027 | 0.1027 |
| T3 | 0.0990 | 0.0990 |
| T49 | 0.0748 | 0.0748 |

TABLE 6

PERCENT ERROR OF AUXILIARY OUTPUT ESTIMATES

| Auxiliary Outputs | SVD-based tuners | Health Parameter-based Tuners |
|---|---|---|
| WR2A | 0.1081 | 0.0787 |
| FN | 0.2704 | 0.2745 |
| FG | 0.1225 | 0.1169 |
| SMW12 | 0.4348 | 0.3469 |
| SMW2 | 6.1605 | 9.3142 |
| SMW25 | 2.0326 | 2.6733 |

Additionally, estimation performance was evaluated for comparable sequences of 400 random simultaneous shifts in all 10 health parameters with six sensors and with eight sensors. For the eight-sensor case, P25 was added to the "new sensor set" of seven shown in table 2. The tuners used were the first eight health parameters, indicated by a (‡) in table 1, (LPT efficiency and flow capacity were not used), selected using OLS. As expected, the estimate of SMW2, which was poor with only seven sensors, was much more accurate, as was the estimate of TMBRNC. For eight sensors, the value of the metric for the SVD-based tuners was 2.0883 and 6.5243 for the health parameter-based tuners; this is essentially the same as for the seven sensor case, with the difference being attributed to the random factors of sensor noise and the health parameter shifts. The sum of the squared percent estimation error for the SVD-based tuners was 6.0438 compared to 7.1943 for the health parameter-based tuners. For the six sensor case, the T3 sensor was removed from the "new sensor set" shown in table 2. The tuners used were the flow capacities of each component plus HPT efficiency, indicated by (§) in table 1, which were selected using engineering judgment. It was possible to get reasonably good matching of the auxiliary outputs with this set of tuners, but no set investigated produced accurate reconstruction of the state variables. The value of the metric for the SVD-based tuners in the six-sensor case was 9.4068 and 12.4667 for the health parameter-based tuners. The big increase in the metric values over the cases with more sensors indicates that significant information has been lost by approximating the G matrix by a rank six matrix. The relative size of the dropped singular values gives an indication of this. In this case, the sum of the squared percent estimation error for the SVD-based tuners was 53.8702 compared to 78.1314 for the health parameter-based tuners.

Further Application of Tuners

The example shows that the optimal tuner selection method obtained using SVD provides accurate estimates of most variables of interest, including auxiliary parameters such as thrust. The SVD formulation has several attractive properties that make its use in this application highly desirable beyond what has already been discussed. In addition to providing the least squares solution to the approximation of the shift vector δ, other features include 1) the approximation error to the matrix G is known; 2) fault detection is possible through the tuners' ability to capture sudden shifts, even if the tuners do not correspond to individual health parameters; and 3) the orthogonality of the V matrix suggests a way to isolate a component fault, while at the same time some of the true health parameter shifts may be able to be reconstructed accurately, in some cases. The following sections provide more detail on each of these topics.

Approximation Error of G

Since $$G = \sum_{i=1}^{n} \sigma_i u_i v_i^T = \sum_{i=1}^{k} \sigma_i u_i v_i^T + \sum_{i=k+1}^{n} \sigma_i u_i v_i^T = \hat{G} + \sum_{i=k+1}^{n} \sigma_i u_i v_i^T \quad (13)$$

the approximation error of G is the last term of equation (13), namely.

$$\tilde{G} = G - \hat{G} = \sum_{i=k+1}^{n} \sigma_i u_i v_i^T.$$

The error in the approximation of G depends on both the number of terms dropped in the approximation and on the size of the singular value in each dropped term. (Singular values given an indication of the linear independence of the columns of G, so if the singular values in the dropped terms are very small, not much information is lost, but on the other hand, if the columns of G are not linearly independent, the accurate estimation of the health parameters is impossible, regardless of the number of sensors.) The fact that the error is known allows, for instance, the calculation of accuracy bounds on the health parameter-induced shifts, δ, and on the estimated variables themselves.

The error introduced into the system equations (eq. 12) through the approximation of G represents modeling error. The process noise term, e, in the state equation, is used at least partially to represent model uncertainty, so a level can be established by multiplying the known approximation error $\tilde{G}$ by a range of degradation values p. Since the level of degradation is unknown a priori, it can be considered a random variable and, thus, so can $\tilde{G}$ p. The covariance of this product could be used to help determine the process noise covariance matrix, Q, for the Kalman filter, which is often considered a design parameter.

Fault Detection

Even though the tuners do not represent individual health parameters, component faults can be detected by sudden shifts. The objective of fault detection in this context is to be able to distinguish an abrupt shift representing a fault, from the general "background level" of degradation caused by use and wear, represented by slowly varying q during normal operation. Since q=V*p, the shifts are mapped into q as long as they are not limited to the null space of V*, that is, as long as they do not lie completely within the span of $[v_{k+1} \ldots v_n]^T$. However, since this space contains the least significant directions of possible shift (since only the smallest singular values are dropped) and the tuners will, in general, cut across rather than align with the influence of each health parameter, additional shifts due to faults Δq=V*Δp will very likely be no-zero for any significant To demonstrate this, component faults of 3 percent magnitude were injected, sustained for 20 seconds, and removed, in succession through each of the 10 health parameters (efficiency then flow capacity for each component in the order shown in table 1), as shown in table 7.

TABLE 7

HEALTH PARAMETER SHIFTS REPRESENTING COMPONENT FAULTS

| Time (sec) | Health Parameters | Shift |
|---|---|---|
| 0-20 | FAN efficiency | -3% |
| 20-40 | FAN flow capacity | -3% |
| 40-60 | LPC efficiency | -3% |
| 60-80 | LPC flow capacity | -3% |
| 80-100 | HPC efficiency | -3% |
| 100-120 | HPC flow capacity | -3% |
| 120-140 | HPT efficiency | -3% |
| 140-160 | HPT flow capacity | 3% |
| 160-180 | LPT efficiency | -3% |
| 180-200 | LPT flow capacity | 3% |

Figure 4:
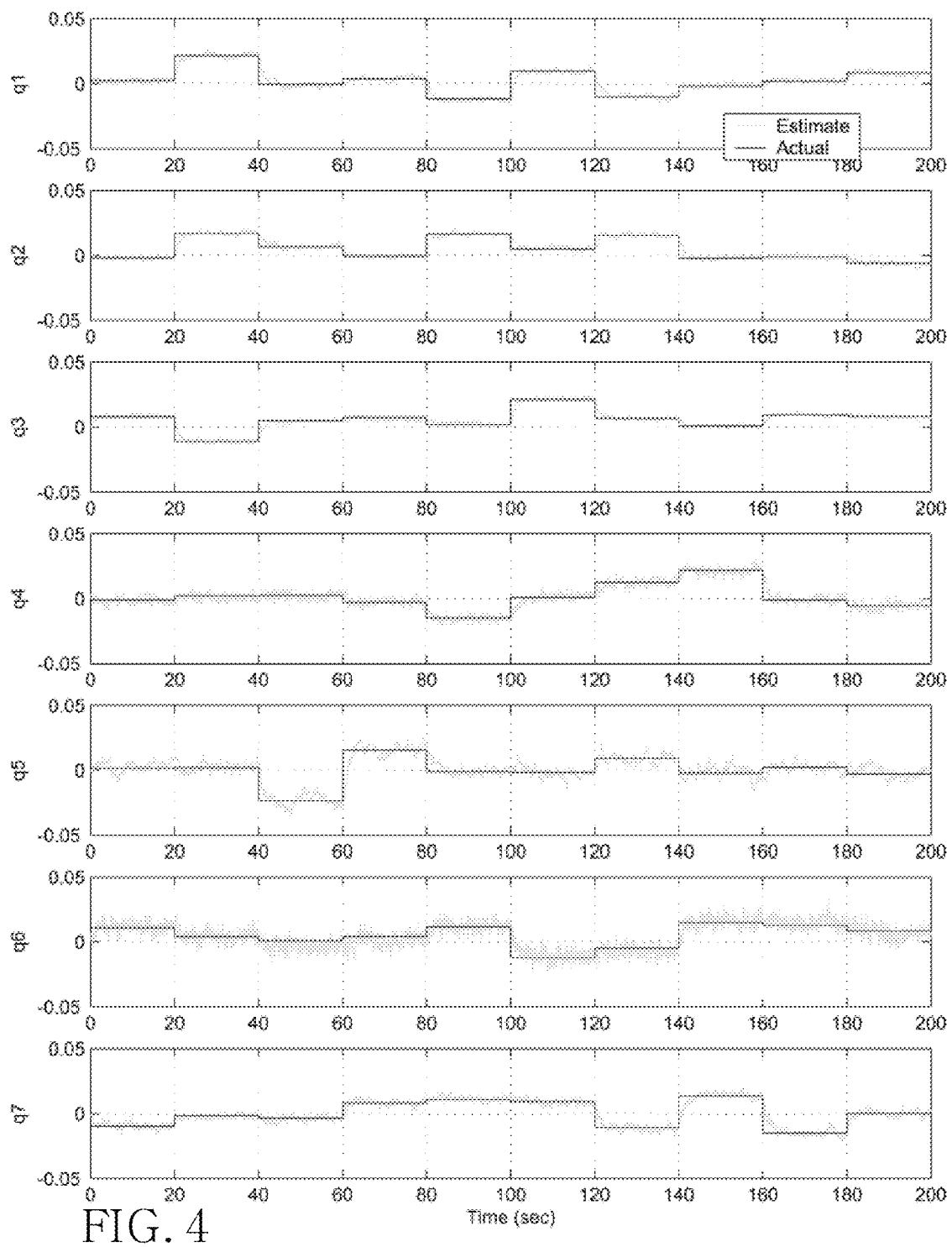
FIG. 4 plots the estimated q signals and V*p demonstrating fault detection.

FIG. 4 shows the estimated tuners during this sequence of shifts. As the health parameters shift the tuners generally shift as well, so changes can be determined and thus faults can be detected. The fan efficiency fault is hard to determine as the tuner shifts that correspond to it are small, but several tuners clearly shift in response to a fault in fan flow capacity. When looking at all tuners together, it is reasonably clear in most cases when a fault has occurred. Different sets of tuners result from different weightings of the G matrix (step 2 of the design procedure), and it is possible to have at least one of the SVD-based tuners align well with an actual health parameter.

Figure 5:
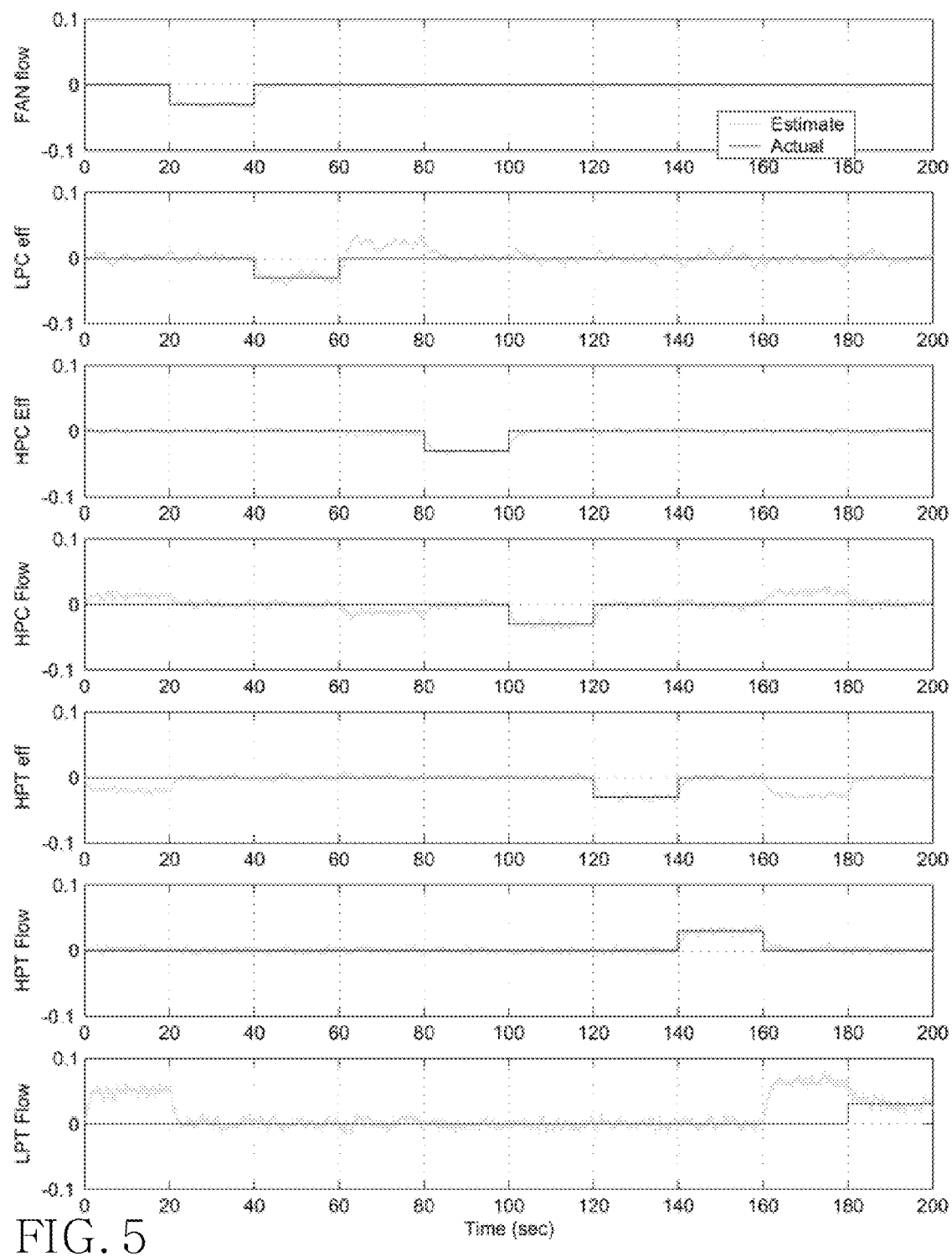
FIG. 5 is a graphic representation of Kalman filter estimates of health parameters based turners with the space input sequence as in FIG. 4.

One thing that is clear from FIG. 4 is that in this example, the elements of q are tracked accurately, and this is a consequence of the procedure used to select them. This is not the case in general when the tuners are modeled as actual health parameters. FIG. 5 shows the Kalman filter estimates of the health parameter-based tuners with the same input sequence as in FIG. 4. In FIG. 5, the tuners clearly indicate abrupt shifts due to faults, but often do not match the health parameters they represent because of the influence of unmodeled health parameters. Techniques exist to select the health parameters for estimation that are least affected by the unmodeled health parameters and sensor uncertainty (Stamatis, A., Mathioudakis, K., Papailiou, K. D., 1992, "Optimal Measurement and Health Index Selection for Gas Turbine Performance Status and Fault Diagnosis," Journal of Engineering for Gas Turbines and Power, 114, pp. 209-216; Gronstedt, T. U. J., 2002, "Identifiability in Multi-Point Gas Turbine Parameter Estimation Problems," ASME Paper GT2002-30020; Pinelli, M., Sina, P. R., 2002, "Gas Turbine Field Performance Determination: Sources of Uncertainties," Journal of Engineering for Gas Turbines and Power, 124, pp. 155-160; Mathioudakis, K., Kamboukos, Ph., 2004, "Assessment of the Effectiveness of Gas Path Diagnostic Schemes," ASME Paper GT2004-53862; the entire disclosures of which are herein incorporated by reference). From a diagnostic point of view, this is fine, but there is no guarantee that those health parameters will facilitate good reconstruction of auxiliary parameters such as thrust.

The ability to estimate the state and auxiliary variables in the presence of actuator bias is not addressed here. From equation (1) it is clear that the effect of actuator bias is no different than that of health parameter shifts, so as long as the tuners can capture this effect, the results should not deteriorate significantly. As with component degradation and faults, constant actuators biases should be generally represented by the elements of q, and any sudden actuator shifts due to bias should be captured as shifts in the elements of q.

Fault Isolation

By construction, the vector of estimated tuners q≈V*p, (since G is not perfectly recreated by U*V*, the estimated q will not exactly equal V*p, even in a noise-free environment) and the columns of V are orthornormal. Of course, V is a square n×n matrix and V* is k×n, but if k is close to n, in some cases $V^{*T}V^* \approx I_n$. The implication of this is that $V^{*T}q \approx p$, so even if the magnitude of the shift is not determined accurately, the shift might be able to be isolated to the affected health parameters (or at least the affected component) by identifying those elements of the $V^{*T}q$ vector with the largest shifts. Analysis of the V* matrix will determine the feasibility of the approach on a case by case basis.

It is interesting to note that the $V^{*T}q \approx p$ approximation is actually the least squares estimate of p from equation (3). This is clear from the fact that:

$$\hat{\delta}=U^*\hat{q}=U_k\Sigma_k\hat{q}\approx Gp=U\Sigma V^T p \Rightarrow p_{LS}=V\Sigma^\dagger U^{-1}$$
$$U_k\Sigma_k\hat{q}=V_k\hat{q}=V^{*T}\hat{q} \quad (14)$$

where $\Sigma^\dagger$ is the transpose of Σ with the square singular value block inverted. Note that once U is unscaled in step 4 of the design procedure, it is no longer orthonormal, so $U^{-1}$ rather than $U^T$ is used in equation (14).

Figure 6:
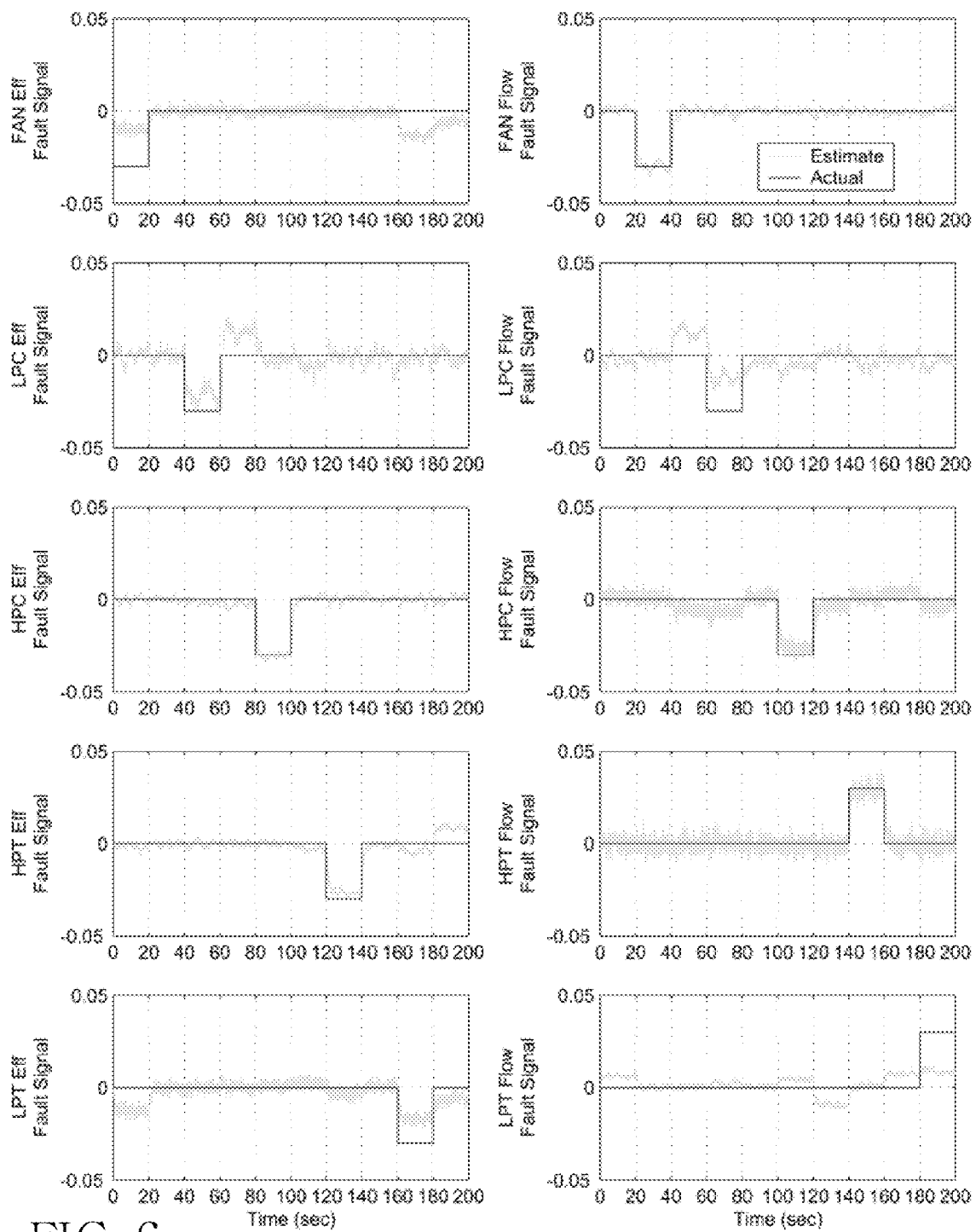
FIG. 6 is a graphic representation of fault signal $\hat{p} \approx V^{*T}\hat{q}$ and actual health parameter shift demonstrating fault isolation.

FIG. 6 shows the recreated set of health parameters using p≈$V^{*T}$q. It is clear that shifts in certain variables are easily isolated while others are mapped back as shifts smeared across more than one health parameter. For this example, it seems that health parameter shifts in the high-pressure shaft components (HPC and HPT) are easier to isolate than those on the low-pressure shaft. For instance, the plots for FAN efficiency and LPT efficiency are very similar, meaning that it would be hard for a diagnostic system to distinguish between them. Efficiency and flow capacity of the LPC are clearly interrelated, with one being nearly the opposite of the other; for cases such as this, one might constrain the problem by assuming that efficiency and flow capacity corresponding to a single component shift together, somewhat simplifying the isolation logic. The issue always exists of simultaneous shifts in the health parameters of multiple components confounding the problem.

It is interesting to compare the results in FIG. 6 with those in FIG. 5, which shows the Kalman filter estimates of seven health parameter-based tuners. The quality of the reconstruction is similar in that the same three parameters (FAN flow capacity, HPC efficiency, and HPT flow capacity) were estimated accurately in both cases and those estimates corrupted by unmodeled shifts in health parameters were the same in both cases, but the approach demonstrated in FIG. 6 has the benefit that the remaining three health parameters are reconstructed as well, albeit corrupted by shifts in other variables. One observation is that the reconstruction of each of these remaining health parameters (FAN efficiency, LPC flow capacity, and LPT efficiency) is strongly related to the reconstruction of some other health parameter, underscoring the lack of observability. Still, a diagnostic system might be able to use this information to isolate faults.

If actuator bias, $u_{bias}$ were to be added on top of the health parameter deviations, it would certainly make the fault isolation task more challenging. An approach to address this is to define G such that:

$$\delta = \begin{bmatrix} L & B \\ M & D \\ N & F \end{bmatrix} \begin{bmatrix} p \\ u_{bias} \end{bmatrix} = G \begin{bmatrix} p \\ u_{bias} \end{bmatrix}.$$

This explicitly accounts for actuator bias, but the increase in the number of columns of G means that the U*V* approximation will be less accurate, since the size of q is fixed. A consequence of this is that $V^{*T}V^*$ is further from $I_n$ (in the sense of the Frobenius norm) and, thus, the $[p^T u_{bias}^T]^T \approx V^{*T}q$ approximation is not as good as when fewer faults are accounted for.

Commercial Benefits

A new optimal linear point design approach to determine engine deterioration tuning parameters that enables the accurate reconstruction of unmeasured engine outputs is presented. It was designed specifically for the case where there are too few sensors to estimate the true engine health parameters. The tuning parameters are determined using singular value decomposition, which was shown to generate the best approximation to the influence of the full set of health parameters in a least squares sense, using a set small enough to be estimated. A concise design procedure to generate the tuners is described. An example demonstrated that the method worked well in reconstructing the unmeasured parameters of interest. It was shown to perform better against its metric than a health parameter-based Kalman filter specifically designed for the metric used, and it will generally result in a smaller total squared estimation error with appropriate weighting incorporated into the metric. This highlights the freedom inherent in the SVD-based approach as a result of the weighting, while the selection of possible subsets of health parameters for tuners is limited. Still, the choice of weights in the SVD approach is not arbitrary since the variables interact, and allowing poor state estimation, for instance, will ultimately hurt the accuracy of the auxiliary variables. It was also shown that the ability to estimate well is sensitive to sensor placement. As a side benefit of the estimator formulation process, the tuners have desirable properties for diagnostics because of the orthogonal decomposition. In particular, the reconstruction of the complete set of health parameters compares favorably to the estimation of only a subset by a health parameter-based Kalman filter. The effect of actuator bias was not investigated with respect to the optimal tuners determined for health parameter degradation, however, a consistent approach to account for it explicitly is proposed.

The invention may be used to detect faults in unmeasured parameters and may be used to control an i-flight engine by employing a computer to determine the relationship of the tuning factor q to unmeasured parameters and estimate unmeasured auxiliary parameters of the engine that are affected by unmeasured health parameters p.

Although I have described the invention with regard to certain embodiments thereof, the invention is not so limited and those of ordinary skill in the art, reading the foregoing specification and appended drawings, will be able to employ or modify the same without departing from the scope of the following claims.

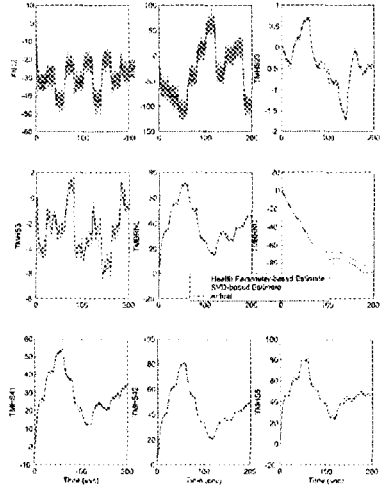

I claim:

1. A method of measuring the health of an engine using h number of parameters, where h is defined as a complete set of health parameters sufficient to fully define a health condition, said method comprising:

measuring a predetermined number of engine outputs using sensors, the predetermined number being less than h;

estimating unmeasured outputs of an engine using a tuning vector q in combination with a transformation matrix V* where q=V*p, where p is a vector of health parameters h, and q contains some information from each of the h number of parameters needed to compute the health condition; and estimating the health condition of said engine based upon measured engine outputs.

2. The method of claim 1, wherein the engine is a turbofan engine and the unmeasured parameters which are estimated by the tuning vector q in conjunction with a transformation matrix are capable of detecting a stall condition during the flight of an aircraft.

3. The method of claim 1, wherein the unmeasured output that is estimated using the tuning vector is one selected from the group consisting of gross thrust and net thrust.

4. The method of claim 1, wherein the step of estimating the unmeasured outputs comprises determining degraded operation of an engine due to shifts in the health parameters, and wherein the health parameters include fan efficiency, fan flow capacity, low pressure compressor efficiency, low pressure compressor flow capacity; high pressure compressor efficiency; high pressure compressor flow capacity; high pressure turbine efficiency; high pressure turbine flow capacity; low pressure turbine efficiency and low pressure turbine flow capacity.

5. The method of claim 1, wherein the tuning vector is represented by q and its estimate of value corresponds to the relationship expressed as:

$$\begin{bmatrix} \dot{x} \\ \dot{q} \end{bmatrix} = \begin{bmatrix} A & U_L^* \\ 0 & 0 \end{bmatrix} \begin{bmatrix} x \\ q \end{bmatrix} + \begin{bmatrix} B \\ 0 \end{bmatrix} u + e$$

$$y = \begin{bmatrix} C & U_M^* \end{bmatrix} \begin{bmatrix} x \\ q \end{bmatrix} + Du + w$$

$$z = \begin{bmatrix} E & U_N^* \end{bmatrix} \begin{bmatrix} x \\ q \end{bmatrix} + Fu$$

where x is the vector of state variables, y is the vector of measured outputs, z is a vector comprising unmeasured model-based outputs, x(dot) is the derivative dx/dt, q is a tuning vector, q(dot) is the derivative dq/dt, U is an orthogonal square matrix derived from the Singular Value Decomposition of a matrix that maps engine health parameters into x, y, and z, k is equal to the number of sensors less the number of zero eigenvalues of the matrix A, $U_L^*$ consists of the first k columns and the first l rows of U, where l equals the number of state variables x, $U^*_M$ consists of the first k columns and the rows from l+1 to l+m of U, where m equals the number of measured outputs y, $U^*_N$ consists of the first k columns and rows l+m+1 to l+m+n of U, where n equals the number of unmeasured outputs z, w represents white measurement noise, e represents white process noise, and A, B, C, D, E, and F are matrices based upon the linear engine model.

6. The method of claim 5, wherein the measured parameters are measured by sensors y, and further selecting a k number of values, where k is equal to the number of sensors less the number of zero eigenvalues in the matrix A.

7. A method of determining faults in a turbofan engine where the fault is not in a measured parameter, by estimating the tuning vector q of claim 5 a number of times and determining abrupt shifts in the tuner as an indication of a fault.

8. The method of claim 1 wherein p is mapped into q through the transformation matrix V* such that q=V*p where V* is full rank.

9. The method of claim 1 wherein the step of estimating unmeasured engine outputs using a tuning vector comprises employing a computer to estimate the tuning vector q a number of times and determining abrupt shifts in the tuning vector as an indication of a fault.

10. The method of claim 9, where the unmeasured parameter is one selected from the group consisting of gross thrust and net thrust.

11. The method of claim 9 wherein the unmeasured parameters comprises net thrust and gross thrust the method is used to control an i-flight engine.

12. The method of claim 11, wherein the relationship between tuning vector q and the unmeasured parameters satisfies the expression $$\begin{bmatrix} \dot{x} \\ \dot{q} \end{bmatrix} = \begin{bmatrix} A & U^*_L \\ 0 & 0 \end{bmatrix} \begin{bmatrix} x \\ q \end{bmatrix} + \begin{bmatrix} B \\ 0 \end{bmatrix} u + e$$

$$y = \begin{bmatrix} C & U^*_M \end{bmatrix} \begin{bmatrix} x \\ q \end{bmatrix} + Du + w$$

$$z = \begin{bmatrix} E & U^*_N \end{bmatrix} \begin{bmatrix} x \\ q \end{bmatrix} + Fu$$

where x is the vector of state variables, y is the vector of measured outputs, z is a vector comprising unmeasured model-based outputs, x(dot) is the derivative dx/dt, q is a tuning vector, q(dot) is the derivative dq/dt, U is an orthogonal square matrix derived from the Singular Value Decomposition of a matrix that maps engine health parameters into x, y, and z, k is equal to the number of sensors less the number of zero eigenvalues of the matrix A, $U^*_L$ consists of the first k columns and the first l rows of U, where l equals the number of state variables x, $U^*_M$ consists of the first k columns and the rows from l+1 to l+m of U, where m equals the number of measured outputs y, $U^*_N$ consists of the first k columns and rows l+m+1 to l+m+n of U, where n equals the number of unmeasured outputs z, w represents white measurement noise, e represents white process noise, and A, B, C, D, E, and F are matrices based upon the linear engine model.

13. The method of claim 1 wherein engine component performance is estimated by health parameters in the following state-space equations $$\dot{x} = Ax + Lh + Bu_{cmd}$$

$$y = Cx + Mh + Du_{cmd} + v$$

where the vector x represents the state variables, x(dot) is the derivative dx/dt, h represents health parameters, $u_{cmd}$ represents control variables, y represents the sensor measurement vector which is corrupted by the noise vector v; and the matrices A, B, C, D, L and M have appropriate dimensions.

14. The method of claim 1 wherein the health parameters define a health condition sufficient to determine deterioration manifested as a shift in operating point from a baseline engine.

* * * * *

UNITED STATES PATENT AND TRADEMARK OFFICE
CERTIFICATE OF CORRECTION

| | |
|---|---|
| PATENT NO. | : 8,185,292 B2 |
| APPLICATION NO. | : 12/973385 |
| DATED | : May 22, 2012 |
| INVENTOR(S) | : Jonathan S. Litt |

It is certified that error appears in the above-identified patent and that said Letters Patent is hereby corrected as shown below:

In claim 11, line 3, "i-flight" should read -- in-flight --.

Following claim 14, insert the following claims:

-- 15. A method of determining faults in a turbofan engine where the detection of an engine fault is not evident in a measured parameter, the engine fault being determined by estimating a tuning vector $q$ a number of times and determining abrupt shifts in the tuning vector as an indication of a fault; where q and its estimate of value corresponds to the relationship expressed as:

$$\begin{bmatrix} \dot{x} \\ \dot{q} \end{bmatrix} = \begin{bmatrix} A & U_L^* \\ 0 & 0 \end{bmatrix} \begin{bmatrix} x \\ q \end{bmatrix} + \begin{bmatrix} B \\ 0 \end{bmatrix} u + e$$

$$y = \begin{bmatrix} C & U_M^* \end{bmatrix} \begin{bmatrix} x \\ q \end{bmatrix} + Du + w$$

$$z = \begin{bmatrix} E & U_N^* \end{bmatrix} \begin{bmatrix} x \\ q \end{bmatrix} + Fu$$

where x is the vector of state variables, y is the vector of measured outputs, z is a vector comprising unmeasured model-based outputs, x(dot) is the derivative dx/dt, $q$ is a tuning vector, $q$(dot) is the derivative dq/dt, $U$ is an orthogonal square matrix derived from the Singular Value Decomposition of a matrix that maps engine health parameters into x, y, and z, k is equal to the number of sensors less the number of zero eigenvalues of the matrix $A$, $U^*_L$ consists of the first k columns and the first $l$ rows of $U$, where $l$ equals the number of state variables x, $U^*_M$ consists of the first k columns and the rows from $l$+1 to $l$+$m$ of $U$, where m equals the number of measured outputs y, $U^*_N$ consists of the first k columns and rows $l$+m+1 to $l$+m+n of $U$, where n equals the number of unmeasured outputs z, w represents white measurement noise, e represents white process noise, and $A$, $B$, $C$, $D$, $E$, and $F$ are matrices based upon the linear engine model.

Signed and Sealed this
Fourteenth Day of August, 2012

David J. Kappos
*Director of the United States Patent and Trademark Office*

16. The method of claim 15, wherein the fault determined is at least one from the group consisting of fan efficiency, fan flow capacity, low pressure compressor efficiency, low pressure compressor flow capacity; high pressure compressor efficiency; high pressure compressor flow capacity; high pressure turbine efficiency; high pressure turbine flow capacity; low pressure turbine efficiency and low pressure turbine flow capacity.

17. The method of claim 15, wherein the engine fault is determined by estimating the tuning vector q such that $q=V^*p$; where $p$ is a vector of health parameters which is mapped into q through a transformation $V^*$ where $V^*$ is full rank.

18. The method of claim 15 wherein the health of an engine is determined by h-number of parameters and where h is defined as a complete set of health parameters sufficient to fully define a reference health condition and wherein the method comprises:
      measuring a predetermined number of engine parameters using sensors, the predetermined number being less than h; and estimating the unmeasured health parameters needed to determine whether an engine fault exists by estimating a tuning vector $q$ a number of times and determining abrupt shifts in the tuning vector as an indication of a fault.

19. The method of claim 18 wherein the health parameters define a health condition sufficient to determine deterioration manifested as a shift in operating point from a baseline engine. --

UNITED STATES PATENT AND TRADEMARK OFFICE
CERTIFICATE OF CORRECTION

| | | |
|---|---|---|
| PATENT NO. | : 8,185,292 B2 | |
| APPLICATION NO. | : 12/973385 | |
| DATED | : May 22, 2012 | |
| INVENTOR(S) | : Jonathan S. Litt | |

It is certified that error appears in the above-identified patent and that said Letters Patent is hereby corrected as shown below:

Delete the title page and substitute the attached title page showing the corrected number of claims in patent.

Column 17, line 31 (claim 11, line 3) "i-flight" should read -- in-flight --.

Following claim 14, insert the following claims:

-- 15. A method of determining faults in a turbofan engine where the detection of an engine fault is not evident in a measured parameter, the engine fault being determined by estimating a tuning vector $q$ a number of times and determining abrupt shifts in the tuning vector as an indication of a fault; where q and its estimate of value corresponds to the relationship expressed as:

$$\begin{bmatrix} \dot{x} \\ \dot{q} \end{bmatrix} = \begin{bmatrix} A & U'_x \\ 0 & 0 \end{bmatrix} \begin{bmatrix} x \\ q \end{bmatrix} + \begin{bmatrix} B \\ 0 \end{bmatrix} u + v$$

$$y = \begin{bmatrix} C & U'_y \end{bmatrix} \begin{bmatrix} x \\ q \end{bmatrix} + Du + w$$

$$z = \begin{bmatrix} E & U'_z \end{bmatrix} \begin{bmatrix} x \\ q \end{bmatrix} + Fu$$

where x is the vector of state variables, y is the vector of measured outputs, z is a vector comprising unmeasured model-based outputs, x(dot) is the derivative dx/dt, $q$ is a tuning vector, $q$(dot) is the derivative dq/dt, $U$ is an orthogonal square matrix derived from the Singular Value Decomposition of a matrix that maps engine health parameters into x, y, and z, k is equal to the number of sensors less the number of zero eigenvalues of the matrix $A$, This certificate supersedes the Certificate of Correction issued August 14, 2012.

Signed and Sealed this
Fourth Day of September, 2012

David J. Kappos
*Director of the United States Patent and Trademark Office*

$U^*_L$ consists of the first k columns and the first $l$ rows of $U$, where $l$ equals the number of state variables x, $U^*_M$ consists of the first k columns and the rows from $l+1$ to $l+m$ of $U$, where m equals the number of measured outputs y, $U^*_N$ consists of the first k columns and rows $l+m+1$ to $l+m+n$ of $U$, where n equals the number of unmeasured outputs z, w represents white measurement noise, e represents white process noise, and $A$, $B$, $C$, $D$, $E$, and $F$ are matrices based upon the linear engine model.

16. The method of claim 15, wherein the fault determined is at least one from the group consisting of fan efficiency, fan flow capacity, low pressure compressor efficiency, low pressure compressor flow capacity; high pressure compressor efficiency; high pressure compressor flow capacity; high pressure turbine efficiency; high pressure turbine flow capacity; low pressure turbine efficiency and low pressure turbine flow capacity.

17. The method of claim 15, wherein the engine fault is determined by estimating the tuning vector q such that q=V*$p$; where $p$ is a vector of health parameters which is mapped into q through a transformation V* where V* is full rank.

18. The method of claim 15 wherein the health of an engine is determined by h-number of parameters and where h is defined as a complete set of health parameters sufficient to fully define a reference health condition and wherein the method comprises:
    measuring a predetermined number of engine parameters using sensors, the predetermined number being less than h; and estimating the unmeasured health parameters needed to determine whether an engine fault exists by estimating a tuning vector $q$ a number of times and determining abrupt shifts in the tuning vector as an indication of a fault.

19. The method of claim 18 wherein the health parameters define a health condition sufficient to determine deterioration manifested as a shift in operating point from a baseline engine. --

(12) United States Patent
Litt

(10) Patent No.: US 8,185,292 B2
(45) Date of Patent: May 22, 2012

(54) METHOD FOR ESTIMATION OF AT LEAST ONE ENGINE PARAMETER

(75) Inventor: Jonathan S. Litt, Pepper Pike, OH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/973,385

(22) Filed: Dec. 20, 2010

(65) Prior Publication Data

US 2011/0118950 A1 May 19, 2011

Related U.S. Application Data

(62) Division of application No. 11/747,362, filed on May 11, 2007, now Pat. No. 7,860,635.

(60) Provisional application No. 60/800,558, filed on May 12, 2006.

(51) Int. Cl.
*B64C 19/00* (2006.01)
*G01M 15/14* (2006.01)
*G01M 15/00* (2006.01)

(52) U.S. Cl. ..... 701/100; 701/29.1; 701/32.9; 701/34.4; 701/3

(58) Field of Classification Search ............ 701/29
See application file for complete search history.

(56) References Cited

U.S. PATENT DOCUMENTS

| | | | | |
|---|---|---|---|---|
| 4,215,412 A * | 7/1980 | Bernier et al. | | 701/100 |
| 6,063,129 A * | 5/2000 | Dadd et al. | | 703/7 |
| 6,502,085 B1 * | 12/2002 | Adibhatla et al. | | 706/52 |
| 6,539,783 B1 * | 4/2003 | Adibhatla | | 73/112.06 |
| 6,823,675 B2 * | 11/2004 | Brunell et al. | | 60/773 |
| 7,177,785 B2 * | 2/2007 | Hartmann et al. | | 703/2 |
| 7,328,128 B2 * | 2/2008 | Bonanni et al. | | 702/182 |
| 7,742,904 B2 * | 6/2010 | Healy et al. | | 703/7 |
| 7,769,507 B2 * | 8/2010 | Volponi et al. | | 701/31.6 |
| 2004/0030417 A1 * | 2/2004 | Gribble et al. | | 700/29 |
| 2004/0123600 A1 * | 7/2004 | Brunell et al. | | 60/773 |
| 2005/0043934 A1 * | 2/2005 | Hartmann et al. | | 703/2 |
| 2006/0047403 A1 * | 3/2006 | Volponi et al. | | 701/100 |

(Continued)

OTHER PUBLICATIONS

Luppold, R.H., Gallops, G.W., Kerr, L.J., Roman, J.R., "Estimating In-Flight Engine Performance Variations Using Kalman Filter Concepts," AIAA-89-2584i; 25th Joint Propulsion Conference Monterey. CA / (Jul. 10-12, 1989).

(Continued)

*Primary Examiner* — Shelley Chen
(74) *Attorney, Agent, or Firm* — Lawrence E. Anderson

(57) ABSTRACT

A system comprising determination of tuning parameters enabling optimal estimation of unmeasured engine outputs, e.g., thrust. The level of degradation of engine performance is generally described by unmeasurable health parameters related to each major engine component. Accurate thrust reconstruction depends upon knowledge of these health parameters, but there are usually too few sensors to estimate their values. A set of tuning parameters is determined which accounts for degradation by representing the overall effect of the larger set of health parameters as closely as possible in a least squares sense. The method utilizes the singular value decomposition of a matrix to generate a tuning parameter vector of low enough dimension that it can be estimated by a Kalman filter. Generation of a tuning vector specifically takes into account the variables of interest. The tuning parameters facilitate matching of both measured and unmeasured engine outputs, as well as state variables.

19 Claims, 6 Drawing Sheets